Nov. 14, 1939.　　　J. J. CUFFLIN　　　2,179,921
UNIVERSAL SHAFT COUPLING
Filed Jan. 21, 1938　　　2 Sheets-Sheet 1

INVENTOR
BY John Joseph Cufflin
E. J. Fetherstonhaugh
ATTORNEY

Patented Nov. 14, 1939

2,179,921

UNITED STATES PATENT OFFICE 2,179,921

UNIVERSAL SHAFT COUPLING

John Joseph Cufflin, Verdun, Quebec, Canada

Application January 21, 1938, Serial No. 186,183

1 Claim. (Cl. 64—7)

The invention relates to a universal shaft coupling as described in the present specification and illustrated in the accompanying drawings that form part of the same.

The invention consists essentially in the cooperation of the driving and driven shafts, transmitting power from one shaft to the other smoothly and without interruption at any point during its revolution even though a longitudinal angular displacement may exist during this revolution, as pointed out in the claim for novelty following a description in detail of the structural features.

The objects of the invention are to provide an improved flexible coupling composed of comparatively few parts; to maintain in any device where a universal coupling is used, such as motor vehicles' smoothness in running and reliable connections between driving and driven shafts, and to eliminate the strains and stresses that are a contant source of worry and expense in both vehicle bodies and transmission parts, and generally to provide within the prime mover, the supplemental forces incidental to the needs of its operations.

In the drawings.

Like numerals of reference indicate corresponding parts in the various figures.

Figure 1:
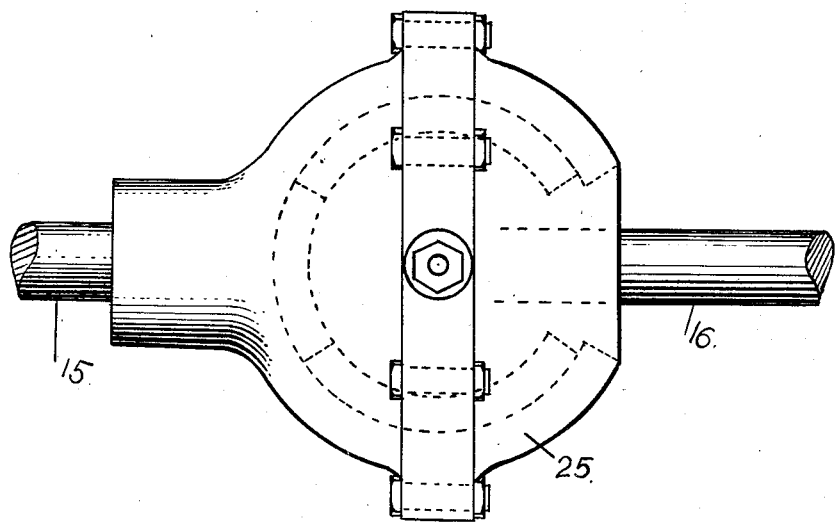
Figure 1 is an elevational view of the shaft coupling showing the two shafts and the spherical housing attached to the driving shaft.
Figure 2:
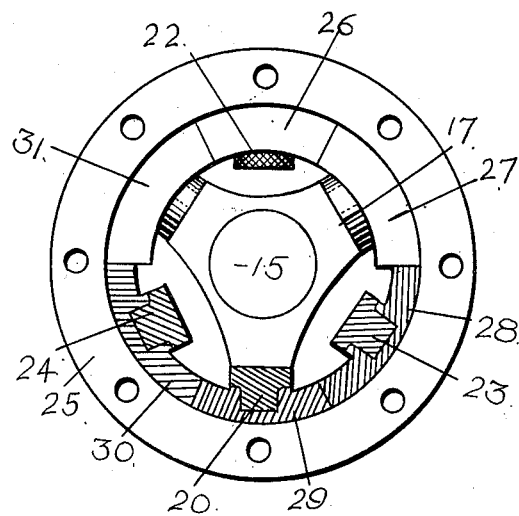
Figure 2 is an enlarged view of the coupling mechanism partly in section.
Figure 3:
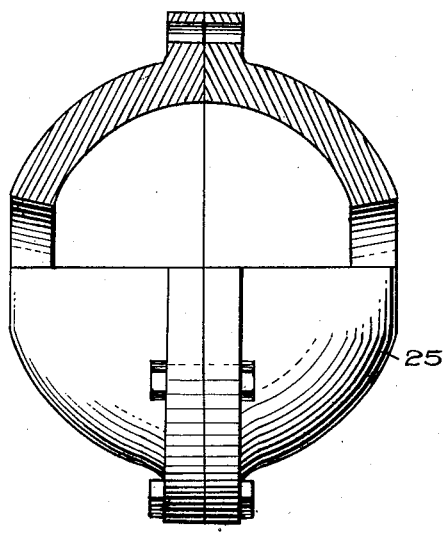
Figure 3 is an enlarged view of the spherical housing partly in section.
Figure 6:
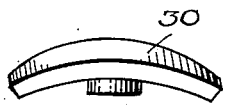
Figure 6 is a perspective view of one of the segments.
Figures 4, 5:
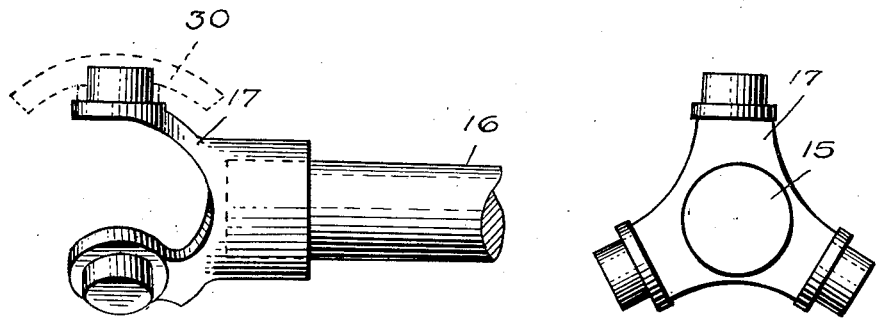
Figure 4 is a plan view of a forked member.
Figure 5 is an elevational view of a forked member attached to the driving shaft.

Referring to the drawings, the numeral 15 indicates the driving shaft and the numeral 16 indicates the driven shaft. Both shafts have at their outer ends a forked member attached thereto, the forked member 17 being keyed on the driving shaft 15 and the forked member 18 being keyed on the driven shaft 16. The members 17 and 18 are shaped with three pins each, the member 17 having the pins 19, 20, and 21, and the member 18 having the pins 22, 23, and 24. These pins are in right angles to the shafts 15 and 16, and each of the pins are disposed at an angle of 120° to each other.

The spherical housing 25 encloses the spherical segments 26, 27, 28, 29, 30 and 31, and these segments are engaged by the pins on the forked members 17 and 18, and the segments are free to move on these pins, and each segment will accommodate the displacement of its fellow segments which of course will only occur during longitudinal angular variations in the shafts.

The spherical housing 25 will very accurately accommodate the segments and their driving members, affording a bearing and means for lubrication that may be sealed. The housing may be attached to either one of the shafts since it does not apply any force, nor is there any force applied through it. Force applied is distributed over a wide area, that is the longitudinal flat faces of the segments, and even with an angular displacement of the shaft as high as 10°, the movements on the coupling are very small.

It has been proved through experiments that six segments are to be desired in this coupling.

In the operation of this invention, assuming that the shafts are stationary and so situated that one of the segments 26 belonging to the driven shafts is directly at top centre, and is part of the driven shaft. The segment 27 is next and is part of the driving shaft, the segment 28 is driven, 29 is driving, 30 is driven, and 31 is driving. If during this stationary period we allow the driven shaft to assume an angle with the driving shaft in a direct downward direction, the segment 26 will follow the direction of the driven shaft, while the segments 28 and 30 will travel half the distance in the opposite direction at the same time these segments 28 and 30 will turn slightly on their respective pins, and at the same time, the segments 27 and 31 will revolve slightly on their pins to accommodate the segments 26, 28, and 30, the segment 29 remaining in its position.

What I claim is:

In a universal shaft coupling, a driving shaft, a driven shaft, a spherically shaped housing enclosing the adjacent ends of said driving and driven shafts and secured to one of said shafts, a forked shaped member within said housing and secured to said driving shaft, a forked shaped member within said housing and secured to said driven shaft, pins secured to the forked members, and segments corresponding in number to said pins and mounted thereon and having spherical faces engaging with the inner surface of said housing and adapted to co-ordinate with one another upon displacement occurring during longitudinal angular variations of said shafts.

JOHN JOSEPH CUFFLIN.